US009749256B2

(12) United States Patent
Bobrek (10) Patent No.: US 9,749,256 B2
(45) Date of Patent: Aug. 29, 2017

(54) DATA COMMUNICATIONS NETWORK FOR AN AIRCRAFT

(71) Applicant: GE Aviation Systems LLC, Grand Rapids, MI (US)

(72) Inventor: Pavlo Bobrek, Bradenton, FL (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 14/052,099

(22) Filed: Oct. 11, 2013

(65) Prior Publication Data

US 2015/0103734 A1   Apr. 16, 2015

(51) Int. Cl.
| | |
|---|---|
| *H04L 12/865* | (2013.01) |
| *H04L 12/835* | (2013.01) |
| *H04L 12/863* | (2013.01) |
| *H04L 12/851* | (2013.01) |
| *H04L 12/801* | (2013.01) |
| *H04L 12/911* | (2013.01) |
| H04B 7/185 | (2006.01) |

(52) U.S. Cl.
CPC .......... *H04L 47/6275* (2013.01); *H04L 47/10* (2013.01); *H04L 47/2441* (2013.01); *H04L 47/6255* (2013.01); *H04L 47/70* (2013.01); *H04B 7/18506* (2013.01)

(58) Field of Classification Search
CPC .. H04L 47/10; H04L 47/2441; H04L 12/5695
See application file for complete search history.

(56) References Cited

U.S. PATENT DOCUMENTS

| | | | | |
|---|---|---|---|---|
| 4,217,652 A | * | 8/1980 | Klaus | G06J 3/00 708/2 |
| 5,805,828 A | | 9/1998 | Lee et al. | |
| 7,164,687 B2 | | 1/2007 | Namihira | |
| 7,929,433 B2 | | 4/2011 | Husak et al. | |
| 2002/0144010 A1 | * | 10/2002 | Younis | G06F 9/546 719/314 |
| 2003/0117958 A1 | * | 6/2003 | Nation | H04L 47/10 370/235 |

(Continued)

FOREIGN PATENT DOCUMENTS

| | | |
|---|---|---|
| JP | 10109697 A | 4/1998 |
| JP | 2000056992 A | 2/2000 |

(Continued)

OTHER PUBLICATIONS

GB Search Report issued in connection with corresponding Application No. GB1417319.9 on Mar. 19, 2015.

(Continued)

*Primary Examiner* — Michael Thier
*Assistant Examiner* — Brian Cox
(74) *Attorney, Agent, or Firm* — GE Global Patent Operation; William S. Munnerlyn (57) ABSTRACT

A method for servicing multiple data queues in communication with a data communications network. The multiple data queues may receive data of differing priority and/or the data queues may be arranged for data with a predetermined priority. The data in the data queues may be serviced by the same processor. A schedule may be applied to the data in the data queues to control the servicing the data in the data queues.

18 Claims, 2 Drawing Sheets

(56) References Cited

U.S. PATENT DOCUMENTS

| | | | |
|---|---|---|---|
| 2003/0149785 A1* | 8/2003 | Gerla | H04L 29/06 709/232 |
| 2003/0236815 A1 | 12/2003 | Brenner et al. | |
| 2004/0181638 A1 | 9/2004 | Linehan et al. | |
| 2004/0183912 A1 | 9/2004 | Szolyga et al. | |
| 2005/0111422 A1 | 5/2005 | Nakanishi et al. | |
| 2006/0140191 A1 | 6/2006 | Naik | |
| 2007/0124415 A1 | 5/2007 | Lev-Ran et al. | |
| 2007/0297435 A1 | 12/2007 | Bucknell et al. | |
| 2008/0059705 A1 | 3/2008 | Bégon et al. | |
| 2008/0158246 A1* | 7/2008 | Ishii | G06T 7/0083 345/604 |
| 2010/0017441 A1* | 1/2010 | Todd | 707/200 |
| 2010/0070445 A1 | 3/2010 | Vian et al. | |
| 2010/0232370 A1 | 9/2010 | Jing et al. | |
| 2011/0122887 A1* | 5/2011 | Ma et al. | 370/413 |
| 2011/0296379 A1* | 12/2011 | McCready | 717/121 |
| 2012/0207183 A1 | 8/2012 | Bobrek et al. | |
| 2012/0250692 A1 | 10/2012 | Assarpour | |
| 2012/0250694 A1 | 10/2012 | Hall et al. | |
| 2012/0294161 A1* | 11/2012 | Sunay | H04W 72/1236 370/252 |
| 2012/0320913 A1 | 12/2012 | Vicat-Blanc et al. | |
| 2013/0209087 A1 | 8/2013 | Yuan et al. | |
| 2013/0323687 A1* | 12/2013 | Wenger et al. | 434/29 |
| 2014/0089534 A1 | 3/2014 | Haakegaard et al. | |
| 2014/0161135 A1* | 6/2014 | Acharya et al. | 370/412 |

FOREIGN PATENT DOCUMENTS

| | | | |
|---|---|---|---|
| JP | 2002300199 A | | 10/2002 |
| JP | 2004145812 A | | 5/2004 |
| JP | 2005510893 A | | 4/2005 |
| JP | 2005333724 A | | 12/2005 |
| JP | 2011250310 A | | 12/2011 |
| JP | 2012209945 A | | 10/2012 |
| JP | 2013093834 A | | 5/2013 |
| WO | 2004047379 A2 | | 6/2004 |

OTHER PUBLICATIONS

Unofficial translation of JP office action issued in connection with corresponding JP Application 2014-206034. Office Action is dated Jan. 19, 2016.

Unofficial translation of JP office action issued on Oct. 6, 2015 in relation to corresponding JP application 2014-206034.

Great Britain Action issued in connection with corresponding GB Application No. 1417319.9 on Dec. 2, 2016.

US Final Office Action issued in connection with related U.S. Appl. No. 14/052,188 on Jan. 12, 2017.

Unofficial English Translation of Japanese Search Report issued in connection with related JP Application No. 2016521708 dated Apr. 3, 2017.

Unofficial English Translation of Japanese Office Action issued in connection with related JP Application No. 2016521708 dated Apr. 25, 2017.

Lopez-Jaquero et al, "Supporting ARINC 653-based Dynamic Reconfiguration," Software Architecture (WICSA) and European Conference on Software Architecture, pp. 11-20, IEEE, Washington, D.C., Aug. 20, 2012.

International Search Report and Written Opinion issued in connection with corresponding Application No. PCT/US14/054710 dated Jan. 22, 2015.

Non Final Office Action issued in connection with related U.S. Appl. No. 14/052,188 dated Oct. 1, 2015.

Non Final Office Action issued in connection with related U.S. Appl. No. 14/052,188 dated Jul. 12, 2016.

GE Related Case Form.

Unofficial translation of FR Search Report and Written Opinion dated Apr. 26, 2017 in connection to corresponding FR Application 1459480.

* cited by examiner

DATA COMMUNICATIONS NETWORK FOR AN AIRCRAFT

BACKGROUND OF THE INVENTION

For contemporary aircraft, an avionics 'platform' consists of a variety of elements such as sensors, sensor data concentrators, a data communications network, radio frequency sensors and communication equipment, computational elements, effectors, and graphical displays. These components must share information with each other over the data communications network.

Legacy incarnations of these platform elements are in the form of individual subsystem elements often referred to as "federated systems". A federated system is an application-specific subsystem in a self-contained package having its own dedicated logic, processors, and input/output interfaces. Multiple and separated federated systems rely on common subsets of data sources, but lack the sharing of processing resources and interfaces among federated systems.

Previous efforts to reduce the reliance on federated systems, resulted in the introduction of the ARINC 653 and ARINC 664 standards. ARINC 653 (A653) is an operating system in which each application, e.g., associated with a federated system function, is granted its own time slice partition and its own memory space partition in which to execute. This enabled what were multiple federated system functions to be hosted on a common processor and to share a common interface and wiring to an avionics data network based on ARINC 664 part 7 (A664p7).

In these systems, data is sampled, published, and transmitted at a higher frequency and an application executing in an ARINC 653 partition is run more frequently in order to ensure that the results produced by an application have sufficiently low input-data-sample-time-to-processed-output delay. Both the frequency of data publication rate and the frequency of application execution tend to be more frequent than would be necessary if data and its processing were synchronized.

BRIEF DESCRIPTION OF THE INVENTION

In one embodiment, the invention relates to a method for servicing multiple data queues in communication with a data communications network for an aircraft having a scheduler and being serviced by a single server, the method includes determining a priority value for the data queues by the scheduler to define a dataset of priority values, determining a fullness value for the data queues by the scheduler to define a data set of fullness values, and servicing the data queues based on the determined dataset of priority values and dataset of fullness values.

DESCRIPTION OF EMBODIMENTS OF THE INVENTION

The described embodiments of the present invention are directed to embodiments of an avionics data communications network, having an avionics data server (ADS), and components for an aircraft, which supports the need to distribute any source of data values to any destination on the aircraft. While possible, embodiments of this invention do not need to impose the requirement that all data paths of the aircraft must go through the data communications network as there will be certain point-to-point flows, for example, for which there will be no advantage to pass them through the ADS. However, at least most of the data flows which need conversion, interworking, processing, synchronization, traffic shaping, policing, multicasting, etc. can benefit from the functionality that the ADS provides.

Figure 1:
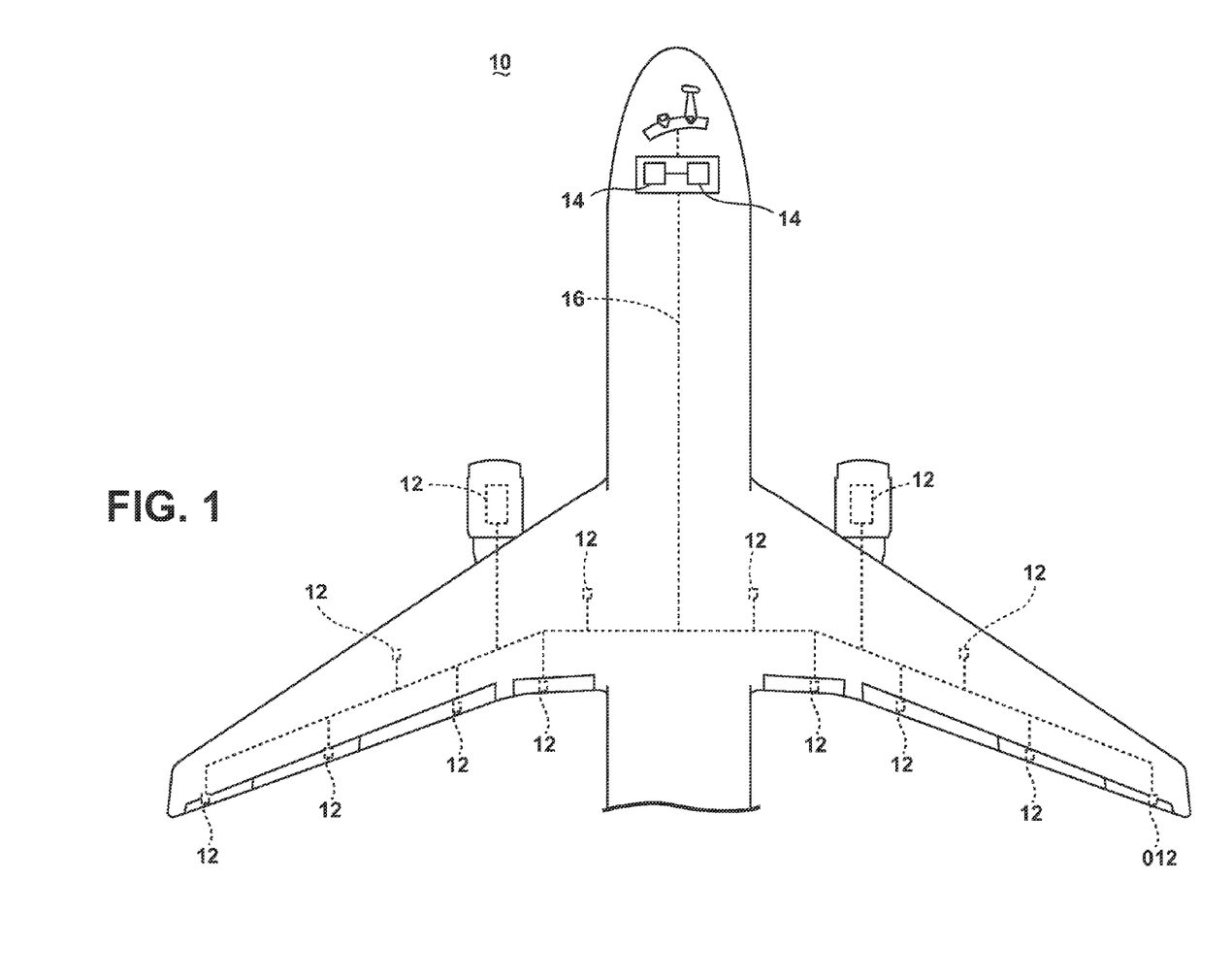
FIG. 1 is a schematic view of a data communications network for an aircraft in accordance with one embodiment of the invention.

As shown schematically in FIG. 1, an aircraft 10 is shown having a plurality of remote input units (RIUs) 12, for instance various sensors or instruments and at least one subscriber unit 14 electrically connected to a data communications network 16 for operation of the aircraft 10. Each RIU 12 may provide data, or data frames, to the data communications network 16, and each subscriber unit 14 may consume a message based on at least some of the raw data. Subscriber units 14 may, for example, include additional avionics systems, processors, displays, or redundancy verification systems. The RIUs 12 and subscriber units 14 may provide and consume data at different data transmission rates, which are effectively managed by the data communications network. Additional RIUs 12 and/or subscriber units 14, or placement of the units 12, 14 are envisioned. It will be understood that while one embodiment of the invention is shown in an aircraft environment, the invention is not so limited and has general application to data communications networks in non-aircraft applications, such as other mobile applications and non-mobile industrial, commercial, and residential applications.

Figure 2:
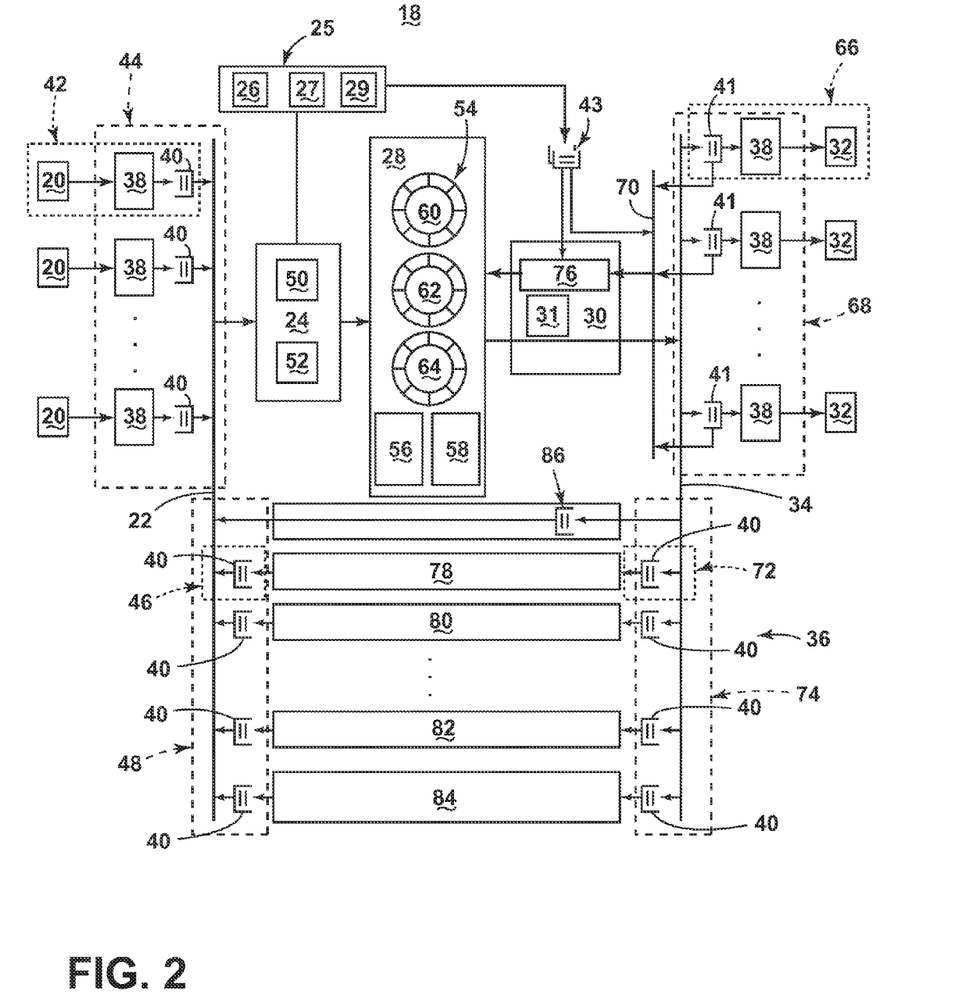
FIG. 2 is a schematic view of the avionics data server in accordance with one embodiment of the invention.

FIG. 2 shows a high-level block diagram of the data communications network, including the Avionics Data Server (ADS) 18. The ADS 18 may comprise a plurality of physical RIUs 20 connected to a common ingress interface 22; an ingress port scheduler 24; a frame descriptor manager (FDM) 25 having a descriptor look-up table (DLT) 26, a policer 27, and descriptor multicast distributor (DMD) 29; a central data server (CDS) 28; an egress parametric message scheduler (PMS) 30 having a parametric message constructor (PMC) 31; a plurality of physical subscriber units 32 connected to a common egress interface 34; and a plurality of virtual links 36.

Each RIU 20 is connected to the common ingress interface 22 via one data coupling 38 and at least one data queue 40, defining a physical ingress port 42. The data coupling 38 may have capabilities to receive a data frame from a physical connector, and may, for instance, include physical connectors such as an Ethernet port, and/or a software or protocol layer compatibilities, such as Media Access Control (MAC) or internet protocol (IP) routing, or a serial interface. Collectively, the physical ingress ports 42 define an ingress physical interface 44. Although a limited number of physical ingress ports 42 are shown, it is envisioned there may be any number, with one working example including forty-eight ingress ports 42, wherein the first sixteen ports 42 may be, for instance, Ethernet ports 42, and the remaining thirty-two ports are for ARINC 429 interfaces. An alternate number of ports are envisioned, as well as alternate divisions of two or more interfaces. The ADS 18 is capable of interfacing with a plurality of physical RIU 20 and virtual link 36 data protocols, for example, Ethernet, IEEE 802.3, ARINC 664 part 7 (A664p7), CAN bus, ARINC 429 (A429), ARINC 661, and other legacy protocols, etc. It is envisioned interfacing protocols may or may not have a physical interface, and may include, for instance, wireless technology such as Bluetooth or WiFi.

The common ingress interface 22 may be further connected to at least one virtual ingress port 46, wherein the port 46 provides at least some raw data, via a data queue 40, to the interface 22. Collectively, the virtual ingress ports 46 define an ingress virtual interface 48. Each physical and/or virtual ingress port 42, 46 is capable of providing at least some raw data to the common ingress interface 22.

The ingress port scheduler 24 receives input from the common ingress interface 22, provides output to the FDM 25 and the CDS 28, and may further comprise a time of arrival (ToA) recorder 50 and ingress port concentrator 52. The policer 27 may monitor and/or affect the operation of the FDM 25. The DMD 29 may provide an output connection to a set of per-egress-port descriptor queues 43, which operate in a first-in, first-out (FIFO) configuration. The DMD 29 may write the same descriptor to more than one of the per-egress-port descriptor queues 43 if the same message is to be transmitted to more than one physical subscriber unit 32. Each per-egress-port descriptor queue 43 is further connected to queue fullness interface 70.

The CDS 28 comprises memory for storing at least one circular buffer 54, a current value table (CVT) 56, and a parametric message table 58. For example, the CDS 28 memory may include a hard disk drive, a solid state drive, quad data rate (QDR) memory, or a plurality of memory elements arranged for redundancy. In the illustrated embodiment, the CDS 28 comprises three circular buffers 54, each defined by the data rate at which it operates, for example, a 10 megabit-per-second (Mbps) circular buffer 60, 100 Mbps circular buffer 62, and a 1 gigabit-per-second (Gbps) circular buffer 64. In each circular buffer 54, the oldest stored data is overwritten with the newest data arriving from an output by ingress port scheduler 24.

Each physical subscriber unit 32 is connected to the common egress interface 34 via one data couplings 38 and at least one data queue, such as a set of per-egress-port data message queues 41, defining a physical egress port 66. Collectively, the physical egress ports 66 define an egress physical interface 68. Each per-egress-port data message queue 41 of each physical egress port 66 is further connected to the queue fullness interface 70. The common egress interface 34 may be further connected to at least one virtual egress port 72, wherein the port 72 receives a message, via a data queue 40, from the interface 34. Collectively, the virtual egress ports 72 define an egress virtual interface 74. It is envisioned each physical egress port 66 may be associated with one data message queue 41 but any number of per-egress-port data descriptor queues 43, with the illustrated embodiment having, for example, one data queue 41 and four descriptor queues 43 per physical egress port 66, 72.

The egress parametric message scheduler (PMS) 30 may further comprise an egress arbiter, for instance, a rules-based scheduler 76, which may use queue fullness interface 70 to determine from which one of the per-egress-port descriptor queues 43 to receive a descriptor provided by the DMD 29. That descriptor is used to read and verify a specified data frame from CDS 28. If the frame is so verified, PMS 30 may further provide an output from the CDS 28, through the common egress interface 34, to the physical egress port 66 which is associated with the per-egress-port descriptor queue 43 from which the descriptor was received.

The egress parametric message scheduler (PMS) 30 may further comprise a parametric message constructor (PMC) 31, which may use the contents of a Parametric Message Table 58 and data values contained in CVT 56 and/or circular buffer 54 (e.g., if it contains an A429 multiword message) to originate construction of messages for consumption by subscriber units 32 and/or egress ports 66, 72.

The PMS 30, rules-based scheduler 76, and/or PMC 31 may, for instance, include an executable program running on a general purpose computer on the network, or an executable program running on a specific purpose computer. Alternatively, PMS 30, rules-based scheduler 76, and/or PMC 31 may include a hard-coded functioning logic device. The rules-based scheduler 76 may receive inputs from per-egress-port-descriptor queues 43 and queue fullness interface 70 to enable PMS 30 to select and verify a message from CDS 28 to the common egress interface 34. Alternatively, the PMS 30 and/or PMC 31 may use the parametric message table 58 to select which data values from CVT 56 and/or circular buffer 54 may be used to construct a message output to the common egress interface 34. Although the per-egress-port descriptor queues 43 are illustrated as separate from the PMS 30, an embodiment is envisioned wherein the queues 43 may be contained within the PMS 30 and/or the rules-based scheduler 76.

The virtual links 36 may further comprise additional local or remote components of the ADS 18, whereby a message may be transmitted from the virtual egress interface 74, through at least one data queue 40 and virtual link 36, and received by the ingress virtual interface 48. Example virtual links 36 shown include at least one distributed processors 78 capable of performing a processing or computational function on the message, a graphics renderer 80 capable of providing content (e.g., using ARINC 661 widgets) for avionics displays, a virtual end system 82 for interfacing with legacy aircraft systems, network mass storage memory 84 for redundant storage, or a message loop-back port 86 for transmitting a message from PMS 30 to one or more egress ports 68. It is envisioned that the virtual links 36 may be further identified using a virtual link ID (VLid).

The ADS 18 operates to support switching functions to support the need to distribute any source of raw data values to any destination or subscriber unit 32 on the aircraft 10. It is envisioned that embodiments of the invention may not need to impose the requirement that all raw data flows must go through the ADS 18 as there will be certain point-to-point flows, for example, for which there will be no advantage to pass them through the ADS 18. However, all raw data flows which may require switching functions, for instance, conversion, interworking, processing, synchronization, traffic shaping, policing, multicasting, etc., may benefit from the functionality that the ADS 18 provides. Additionally, more than one ADS 18 may be provided on the same aircraft 10 or data communications network 16 in order to provide additional switching capabilities, redundancy safety measures, data mirroring via a storage device or another ADS 18 for verification and validation, or distributed processing.

It is envisioned that each physical egress port 66 may be configured with—multiple per-egress-port descriptor queues 43 to provide multiple paths for descriptors to be consumed by parametric message scheduler 30, based on priority of the message as interpreted by the rules-based arbiter 76. It is envisioned each physical egress port 66 may correspond to any number of per-egress-port descriptor queues 43, with the illustrated embodiment having, for example, four queues 43. It is further envisioned that a per-egress-port descriptor queue serves only one physical egress port 66 or virtual egress port 72.

Each descriptor queue 43 and each egress data queue 41 are configured to transmit a signal indicative of how full the queue 41, 43 is to the queue fullness interface 70, which is used by the rules-based arbiter 76 and parametric message scheduler 30 to select from which per-egress-port descriptor queue 43 the next descriptor is to be received.

Before describing the operation of the ADS 18, a brief discussion of the data used throughout the ADS 18 will aid in understanding the operation of the data communications network 16. Initially, an RIU 20 may provide a data frame to the ADS 18, wherein the data frame has at least an identifier and corresponding raw data. At least one of the ingress physical interfaces 22 and/or the ingress port scheduler 24 parses the received data frame into an identifier, or a parsed descriptor, and parsed corresponding raw data. The parsed descriptor, which may be further updated by the ADS 18, is used to identify and describe the purpose of the raw data, for instance, where the data should be transmitted to or where the data is being transmitted from, while the parsed raw data contains the payload. The ADS 18 later uses the descriptor to identify the location of the raw data, and may construct or calculate the descriptor and/or the raw data into operational data, or a message, for consumption by an egress port 66, 72.

In one example, the ADS 18 operations are capable of receiving a data frame from an asynchronously connected RIU 20, storing the raw data in CDS 28 memory, such as the CVT 56 or circular buffer 54, forming a message from the stored data frame, and sending the formed message to at least one subscriber unit 32. Additionally, there may be a direct loop-back capability which serves as a means for frames, constructed by the Parametric Constructor 31, to appear at an ingress port for frame switching. Individual portions of the ADS 18 and ADS 18 operation will be described in detail.

Ingress Physical Interface Functions

First, data is provided to the common ingress interface 22 from the RIUs 20 of one or more physical interface ports 42. The ingress physical interface 44 may include components, for instance, as part of the data couplings 38, capable of converting data or analogue signals provided by a particular physical ingress port 42 into a data stream or data frame, which is stored in a FIFO ingress data queue 40. In this example, the data couplings 38 may perform the following ingress functions: eliminate corrupt words/frames/data; enable eliminating non-IP data frames (for instance, payload type/length field not equal to 0x0800); time tag the time of arrival of the first byte of data; and queue data frames pending subsequent transfer and processing. Some outputs that may be generated as the data frame enters the ingress port 42, 46 queues 40 are: a port of arrival (PoA), to enforce that a data frame only enters on its designated ingress port 42, 46; a time of arrival (ToA) of the first word; a one-bit pulse for the ToA of a completed frame (for the ToA recorder 50 of ingress port scheduler 24; described below); start of frame and end of frame indicators for frame delineation when the frame is read; and a frame length in number of bytes.

Using the Ethernet paradigm for an external interface to an RIU 20, by way of example, the data coupling 38 for each physical ingress port 42 resembles the receive section of a Media Access Controller (MAC), with ancillary logic to generate, store and recover the above-named parameters, connected to one or more queues 40, for instance, a data FIFO queue 40 and a frame descriptor FIFO queue 40.

It is envisioned that the ingress ports consist of not just those associated with external ingress physical interfaces 44, but internal or ingress virtual interfaces 48 as well, such as those associated with the output of the virtual links 36, such as interworking (e.g., virtual end system 82, parametric message constructor 31), distributed processors 78 and graphics renderer 80.

For sake of health monitoring, per-port statistics may be maintained by the ingress physical interface 44 or data couplings 38. These may include the number of frames received, number of frames discarded due to, for example, cyclic redundancy check (CRC) errors, number of runt (<64 bytes) frames discarded, and/or a number of frames discarded that exceed the maximum frame size allowed on the port. Likewise, statistics may be maintained by the policer 27 which indicate the number of frames passed or discarded that are associated with a particular flow index provided by input port scheduler 24 to FDM 25.

Ingress Scheduler

The ingress port scheduler 24 organizes the raw data received from the ingress physical and/or virtual interfaces 44, 48 into a FIFO order, pending arrival of a completed data frame. In this sense, the switching portion of the ADS 18 may be a store-and-forward design, so that large data frames of various sizes can be stored contiguously in central memory, such as the CDS 28, after arriving at different ingress ports 42, 46. It is envisioned the ADS 18 provides a master time which may or may not be synchronized across various aircraft components, including the CDS 28, CVT 56, PMS 30, and/or the subscriber units 32, or multiple ADSs 18 of the data communications network 16. The ingress port scheduler 24 may also optionally control frame descriptor management (FDM) functions, wherein, for instance, the data frame may be parsed into separate portions including an identifier, or descriptor, and the corresponding raw data.

Time of Arrival Recorder

The ingress Scheduler operation may also include the ToA recorder 50 and one or more ingress port concentrators 52. The ToA recorder 50 determines which ingress port's 42, 46 data frame is to be stored next, based on the master time signal of the ADS 18. The ingress port concentrator 52 funnels arriving data frames or A429 words to at least one of two CDS 28 destinations: one of potentially many circular buffers 54 (in the case of queuing-type data) or the CVT 56 in the case of sampling-type data (described below).

For example, whenever a data frame or an A429 word completely arrives at its physical ingress port's 42 data queue 40, a one-bit pulse may be sent to the ingress scheduler's 24 ToA recorder 50 to record the data frame's time of completion. It is possible for several short raw data frames to arrive on any given port 42, 46 while previously arrived data frames are being transferred out of the data queues 40 of other ports 42, 46. For this reason, it is envisioned the ToA recorder 50 may use, for example, just one bit per data frame per port 42, 46, but which accurately represents the relative time of completion combination on all ports 42, 46. The bits, which collectively represent the completed arrival of a frame on any of the ports 42, 46 during a clock cycle, may be organized into a time of arrival word (TAW).

Each time a data frame or A429 word completes its arrival at an ingress port 42, 46, it may toggle a line dedicated to that input port 42, 46 and set a bit of the TAW. Likewise, any completed arrival during a clock cycle may cause the entire TAW to be written into the ToA recorder 50, organizing the arriving TAW values in a FIFO ordering. If there are no new data frames or A429 word completions during a clock cycle, no TAW is written to ToA recorder 50. Alternatively, if data frames or A429 words complete their arrival concurrently on multiple ports during the same clock cycle, more than one bit of the TAW written into the ToA recorder 50 may be set.

The ingress port concentrator 52 receives the oldest TAW word available at the output of the ToA recorder 50 to determine which data frame or A429 word completed arrival first. The ingress port concentrator 52 thus acts as a port selector which determines which ingress port's 42, 46 data frame is next processed and transferred to the CDS 28. It is possible that frames or words completed arrival simultaneously on different ports within the resolution of a clock cycle and the TAW received from the ToA recorder 50 will have multiple bits set. In that case, the ingress scheduler 24 will service all ports whose data frames completed arrival simultaneously in, for example, a round-robin order, before the next TAW word is received from the output of ToA recorder 50. This operation may guarantee data-rate fairness for all ingress ports 42, 46, regardless of their data arrival rates and/or data frame sizes.

Ingress Port Concentrators

There may be three ingress port concentrators 52 for the ingress port scheduler 24. For example, one ingress port concentrator 52 concentrates the parsed Ethernet frames, or raw data, for writing into one or more circular buffers 54 with their storage information and flow identifier provided to DLT 26 and policer 27, which may result in a descriptor written into descriptor queues 43 by DMD 29 and serviced by rules-based scheduler 76, when scheduled to do so by PMS 30.

A second concentrator 52 may concentrate Ethernet frames, raw data and/or A429 words into the CVT 56, for later utilization by the PMS 30 and/or PMC 31. A third concentrator 52 may concentrate raw data and/or A429 words (e.g., those bearing multiword messages) into one or more circular buffers 54 organized as FIFOs in order to preserve the time order of samples of raw data and/or the order of A429 words. These are referred to herein as A429 output queues.

Once a particular ingress port is selected for service by the ToA recorder 50, the ingress port concentrator 52 coordinates the transfer of parsed raw data from the selected ingress port 42, 46 to the at least one of the CVT 56 or circular buffers 54 of the CDS 28 and/or the FDM 25.

Frame Descriptor Manager

The frame header, frame length, ToA and PoA generated by the ingress physical interface 44 functions are used by FDM 25 to create a descriptor for a data frame and broadcast that descriptor to the set of per-egress-port descriptor queues 43. The FDM 25 may also receive a Head-of-Frame pointer (HOFpointer, for identifying the address of the parsed data) and Time of Frame Storage (ToFS, for identifying how long the parsed data may be acceptably stored) of each Ethernet Frame or A429 word written to the CDS 28. There are two different routing paths used by DMD 29 for descriptor distribution, one for Ethernet frames and one for A429 data words. Additionally, there is a different descriptor for each of these paths.

The Frame Descriptor Manager FDM consists of a data path look up table (DLT) 26, policer 27, and the Descriptor Multicast Distributor (DMD) 29 which enables the same descriptor to be written to multiple per-egress-port descriptor queues 43. The DMD 29 is controlled by a collection of bits output by the DLT 26 which identify to which per-egress-port descriptor queues 43 a descriptor is to be written.

Ingress Look-Up Table

The ingress look-up table may be incorporated into the ingress port scheduler 24, and used to identify data flows and assign a unique index to each flow originating on one of the ingress ports 42, 46. This index serves as a flow identifier for a variety of data path storage and control functions. For example, the index serves as a key for the DLT 26 to retrieve policing parameters and routing bits which indicate into which queues 43 the DMD 29 may store the frame descriptor. The index is also used to retrieve an address for where to store frame data in CDS 28, for example, it may be used to retrieve and store the latest offset address of circular buffer 54. The ingress Look-up Table may include a random access memory, hashing logic and memory, or a content addressable memory (CAM), whose output, the flow index or key, is determined by port number and selected bits of the received data frame. For example, on a per-physical-Ethernet-port basis, a configuration option may be provided to indicate which bits of the UDP/IP/MAC header identify a type of data flow. Alternatively, an ARINC 429 data flow may be identified by the incoming ARINC 429 physical port number concatenated with the 8-bit label of the ARINC 429 word.

This flow index may also provide a failsafe protection against impersonation or data corruption. For example, the DLT 26 output may contain a field which indicates the expected port of arrival (EPoA) for a frame. A check may be made against the actual port number on which that frame arrived, as reported by the ingress physical interface 44. If they do not match, the frame may be discarded.

For ARINC 429 interfaces, the A429 tag and port number are concatenated and used to access a separate lookup table whose output may be the flow index.

Using the flow index, the starting location and the frame length is provided for CDS 28 writing functionality so that the contents of the raw data frame may be written, starting at the correct base address for the proper number of CDS 28 locations.

The flow identifier addresses a routing, policing, and storage parameters table stored in the DLT 26. The output bit fields of this DLT 26 may have different interpretations, depending on the data source and where it is to be stored. Ethernet frames can be stored in a circular buffer 54 or the CVT 56 region of CDS 28. A429 data words can be stored in the CVT 56 or sent directly to one of 48 egress A429 queues, or both. A429 multiword messages may not be stored in CVT 56 unless the destination subscriber unit 32 has a method to prevent temporal aliasing of back-to-back A429 messages or filtering duplicated words belonging to the same A429 message.

In one example, the DLT 26 output which is selected by the flow index may include any combination of: CDS 28 Buffer Base Address plus one bit to indicate whether this base address refers to a CVT 56 location; a Circular Buffer 54 ID; Circular Buffer 54 Size; a virtual link (VL; e.g. virtual egress port 72) account identifier (VLacctID); an expected PoA (EPoA), to enforce that data only enters on its designated ingress port; a 1-bit field which indicates whether this an ARINC 429 word descriptor; a port mask bit vector, which indicates which egress ports 66, 72 receive the frame; a bit field, which indicates the priority of the per-egress-port descriptor queue 41 into which the descriptor is to be written; A664p7 bandwidth allocation gap (BAG) for frame-based policing; a policing discard bit and a policing bypass bit; and a jitter tolerance (JitterT) for frame-based policing a maximum frame length (Smax) or CVT 56 frame length depending on value of the CVT location bit mentioned above.

The CDS 28 write control functionality supports two types of write operations: a CVT 56 write operation and a circular buffer 54 write operation. The DLT 26 output has a CVT location bit to indicate if the value in the base address field is a CVT 56 location (for instance, if the CVT location bit=1). For any given flow index which indicates a CVT 56 write operation, the frames written into CVT 56 should always be of the same size. The CVT 56 bit also dictates whether the value in the Smax field is the fixed length of the CVT 56 frame or the maximum frame size (Smax) of a variable-length frame, which is to be enforced by policer 27 in case of a non-CVT 56 frame. For a CVT 56 frame, if the frame size calculated by the physical interface function does not exactly match the value in the Smax field, the CVT 56 frame may be discarded. Likewise, for a non-CVT-56 frame, if the frame size is greater than Smax, the frame may be discarded.

In the case of a CVT 56 write operation, the location and length of the frame is predetermined or static. The values in the most recently received frame simply overwrite the values in the previous received frame. The output of the DLT 26 directly provides the base address and length of the frame to be written into CVT 56. Whether data is written into CVT 56 memory is determined or policed by its PoA, i.e., whether the flow index determined by the ingress look-up table of the ingress port scheduler 24 is allowed to arrive on a given physical ingress port 42. An unauthorized flow on a physical ingress port 42 may not be allowed to corrupt the CVT 56 memory by preventing its being written to the CVT 56. Furthermore, as stated above, if the frame length computed by the ingress physical interface 44 does not match the Smax field, the frame may be discarded.

Note that it is possible to mirror Ethernet frames containing sampling port data that are written in CVT 56 so other ADSs 18 may store or mirror the same data. This mirroring may be accomplished by, for instance, providing a message to a physical egress port 66 connected to another ADS 18. Alternatively, data mirroring may be accomplished using a centralized data storage device, which for instance, may be accessible to all ADSs 18 as a virtual ingress or egress port 46, 72. One example of this is shown as the network mass storage 84 virtual link 36. It is also possible to store A429 words in a CVT 56 location and write them to one or more of the A429 output queues 41. An A429 word arriving on one of the ingress A429 links, however, cannot go out an Ethernet port unless it is first packed into an Ethernet frame using the PMC 31 (described below).

If the DLT 26 output indicates that the write operation is a circular buffer 54 write operation (for instance, if the CVT location bit=0, indicating a non-CVT 56 frame), then the frame may be written to the next available circular buffer 54 memory location, as determined by, for example, a circular base address, obtained from a field of the DLT 26 output, and a circular buffer offset table, maintained by ingress port scheduler 24. The base address and offset address may be used to track the next location to be written within the circular buffer 54.

Each circular buffer's 54 base address is determined by the memory base address field of the DLT 26 output. Another field of the DLT26 output indicates the circular buffer size. The address of any data word written into the circular buffer 54 is the sum of the circular buffer 54 base address and the circular buffer offset. The circular buffer offset is incremented modulo the circular buffer 54 size after each word written while the circular buffer base address remains fixed. After the last word of a data frame or an A429 word is written into circular buffer 54, the offset address of the next location is recorded in the location within the circular buffer offset table indicated by the flow index and is made available as the starting offset of the next frame written into the same circular buffer 54.

While embodiments of the invention are not restricted, the illustrated embodiment, may have up to 256 circular buffers 8K deep. By way of example, this may allow for a circular buffer 54 to be created for each physical ingress and/or egress port 42, 66. As an alternate example, a circular buffer 54 may be created for every flow index. As yet another example, each circular buffer 54 may represent a collection of virtual output ports or virtual trunks. A "trunk" is associated with an egress set of virtual ports. These virtual ports can be mapped onto any set of physical egress ports 66 or virtual output port 72. For example, the same ARINC 653 (A653) avionics application may reside on multiple line replaceable units (LRUs) for availability reasons, for example, an application which processes air data. These may be connected to different physical egress ports 66 of the ADS 18. But, all of the instances of the application may be configured to form a single trunk group so that they share the same circular buffer 54 to completely isolate its data and bandwidth requirements from other A653 applications. Thus, this level of granularity enables a circular buffer 54 to be allocated per (distributed) A653 application.

Each time data is written into a circular buffer 54, the Descriptor Multicast Distribution function replicates a descriptor, which indicates the location of storage of the associated data frame in the buffer 54. Additionally, the rules-based-scheduler 76 and/or the PMS 30 may operate an Egress Scheduling Function which ensures that each physical egress port 66 receives a copy of the frame if it was provisioned to do so.

In the illustrated configuration, just three circular buffers 54 are used. These are allocated by associating physical egress ports 55 or subscriber units 32 having the same data rates with a common circular buffer 54. This provides the most efficient (shared memory) utilization of the central buffer for A664p7 queuing-type data frames. In this configuration, all 10 Mbps physical egress ports 66 may form one trunk group (10 Mbps circular buffer 60), all 100 Mbps physical egress ports 66 may form another trunk group (100 Mbps circular buffer 62), and all 1000 Mbps (1 Gbps) physical egress ports may form a trunk group (1 Gbps circular buffer 64). Though there are three circular buffers 60, 62, 64 and though a data frame may be bound for physical egress ports 66 having different data rates, the CDS 28 will only store one copy of a frame. The circular buffer 60, 62, 64 that a frame is written to corresponds to the data rate of the slowest physical egress port 66 to which that frame is to be replicated. For sake of simplicity, the remainder of this document will assume that there is a circular buffer 54 per set of physical egress ports 66 having the same egress data rate: 10 Mbps 60, 100 Mbps 62, or 1 Gbps 64.

Policing Function

The Policing functions are performed by a policer 27 which may be a specific purpose hardware logic pipeline in FDM 29 controlled by a state machine. The policer 27 functionality depends on whether the incoming data is an A429 data word or an Ethernet frame. The policer 27 makes a decision which determines whether an Ethernet frame descriptor is allowed to be passed onto the Descriptor Multicast Distributor 29 and whether the incoming data is allowed to be stored in either the CVT 56 or a circular buffer 54 region of the CDS 28. By definition, an ARINC 429 frame produces no Ethernet frame descriptor for the Descriptor Multicast Distributor 29. In this instance, the ingress port scheduler 24 may provide a separate descriptor for a separate data path which bypasses the CDS 28. In another instance, the policer 27 may determine whether an A429 data word may be stored in CVT 56.

For data frames provisioned to be stored in CVT 56, if the frame length is not equal to the provisioned frame length, the frame is discarded. No BAG or jitter tolerance policing need to be enforced.

For data frames provisioned to be stored in a circular buffer 54 and policed, the policer 27 performs a secondary lookup using the VLacctID of the DLT 26 to determine the time of arrival of a previous frame having that VLacctID to enforce BAG and jitter tolerance constraints. If the EPoA of the frame does not match the PoA or the Frame Length exceeds the maximum frame length provisioned for the virtual link (VL), Smax, or there is a BAG/jitter violation, the policer 27 may disable the multicast distribution of the current frame descriptor and preempt the writing of the frame into the CDS 28.

Frame-based BAG and jitter tolerance policing in the policer 27 may be used to ensure that the maximum aggregate rate of data entering a circular buffer 54 is below that needed to ensure the minimum required time-to-live for the slowest (possibly virtual) port receiving data out of that buffer. Frame-based BAG and jitter tolerance policing may also be used to ensure that no egress port 66, 72 in the data communications network 16 exceeds its bandwidth and latency budget. If the policer 27 determines that the configured maximum data rate for a given VLacctID has been exceeded, i.e., that the configured BAG or jitter tolerance is not met, it may prevent a descriptor from being written to the per-egress-port descriptor queues 43 and thereby prevent a frame from being transmitted to physical subscriber units 32.

By way of example, the policer 27 may use six values obtained from DLT 26: control bits (Ctrl), VLacctID, expected port of arrival (EPoA), and the maximum frame size (Smax), bandwidth allocation gap (BAG), and jitter tolerance (JitterT) to determine whether an Ethernet frame descriptor is allowed to be passed onto the Descriptor Multicast Distribution function and whether the incoming data is allowed to be stored in the CDS 28. A664p7 allows multiple virtual links (VLs) to belong to the same VL account, i.e., to have the same VLacctID, and, thereby, to be jointly policed using the Smax, BAG and JitterT configured for that VLacctID. The policer 27 obtains the actual port of arrival (PoA), time of arrival (ToA), current time (T) and a frame arrived indication from the ingress scheduler 24, which includes a time manager that keeps track of current time T.

Descriptor Multicast Distribution

The Descriptor Multicast Distributor (DMD) 29 uses a collection of Port Mask bits output by DLT 26 to determine which set of per-egress-port descriptor queues 43 are to be written with a copy of the frame descriptor. One copy of the descriptor is written for each port 66, 72 that is to receive a copy of a frame which is to be read out of a circular buffer 54 by PMS 30. When the PMS 30 schedules the operation of the rules-based scheduler 76 for a particular egress port 66, it selects a per-egress-port descriptor queue 43 whose output may be used to read a frame out of CDS 28 and transmit it to the physical egress port 66. It may be noted that Ethernet frames and A429 data words stored in CVT 56 do not rely on the DMD, as their distribution is controlled by the PMS 30 and PMC 31 (described below).

The descriptor output by the DMD 29 for a switched data frame may include the location of the first word of the frame (HOFpointer), time of frame storage (ToFS), the frame length, priority (P), and Port Mask. Using the Port Mask and Priority that DMD 29 received from the DLT 26, the DMD 29 produces a bit per egress port priority to indicate which per-egress-port descriptor queues 43 are to accept a copy of the switched data frame descriptor and the priority of the queue 43 into which that descriptor is to be placed. This mechanism may be used, for example, to ensure that a copy of each parametric data frame not received from an ADS 18 is mirrored to another ADS 18. Conversely, if a parametric data frame is received from another ADS 18, it may be stored in the local CVT 56 but not redistributed to other ADSs 18 by virtue of setting each Port Mask bit value corresponding to an ADS-connected egress port to zero (i.e. by failing to identify an egress port 66, 72). By setting each Port Mask bit value corresponding to an ADS-connected egress port to zero, the message may be prevented from propagating among multiple ADSs 18 indefinitely, which may lead to bandwidth overload on the data communications network 16.

Frames bearing parametric data, (e.g., an Ethernet frame with A/D values, ARINC 429 words, the value of discrete bit(s), etc.) may be stored in dedicated, predetermined locations within the CVT 56 region of the CDS 28. On a typical aircraft, there may be 2 to 4 ADSs 18, which include a mechanism for providing each ADS 18 the ability to mirror the content of the other ADS 18 within the airframe. A descriptor for each parametric frame written into CVT 56 (but not received from another ADS 18) may be replicated onto the highest priority per-egress-port descriptor queue 43 of each egress port 66, 72 connected to another ADS 18. The service discipline of the rules based scheduler 76 will ensure that any companion ADSs 18 receive a copy of the most recent frame, as described below.

Central Data Server Write Control Functions

Concurrent with the DMD 29, if the policer 27 passes a frame bound for the CDS 28, it is stored in the circular buffer 54 or CVT 56. The inputs to the CDS 28 Write Control Function may include the Time of Frame Storage (ToFS), frame length from the Ingress Physical Interface 44 Function, plus a circular buffer 54 or CVT 56 memory location from the ingress port scheduler 24 and DLT 26. The circular buffer 54 or CVT 56 memory location becomes the initial value of the address counter and becomes the head of frame pointer (HOFpointer) provided to the DMD 29 to be included in the frame's descriptor. The ToFS, used for frame verification on readout, may be stored as the first word belonging to the frame in CDS 28 memory and all subsequent frame data words continue to be written one at a time, for example, as sixty-four data bits plus ECC, with the address counter incremented after each write. The Write Controller compares the number of byte writes performed with the frame length obtained from the ingress physical interface 44. This continues until the last word is written. The last word written may not be a complete 64-bit word, in which instance the last word may be padded to 64 information bits along with a valid ECC.

As illustrated, the CDS 28 Write Control Function may be configured for three different circular buffers 60, 62, 64 dedicated to store frames bound for 10 Mbps, 100 Mbps, or 1 Gbps egress ports 66, 72, respectively. Only one copy of a frame is ever stored while multiple copies of the descriptor referencing the frame may be multicast to per-egress-port descriptor queues 43. The circular buffer 60, 62, 64 in which a frame may be stored depends on the slowest egress port 66, 72 to which that frame is to be copied/multicast. Successive frames stored in each of these circular buffers 60, 62, 64 are stored contiguously within the buffer 60, 62, 64, with oldest frame's words being overwritten by the newest frames.

When data is written to a circular buffer 60, 62, 64, the length of the frame is determined by the number of bytes counted for that frame by the physical ingress interface 44 function (e.g. FrameLength input). In a properly provisioned deterministic system, it is envisioned that a premature overwrite of a frame in the circular buffer 60, 62, 64, whose multicasting was not completed to all of its egress ports 66, 72, should never occur. Nonetheless, an overwrite may be easily detected by a mismatch of the 64-bit time stamp ToFS, which was the first word written at the head of the frame into CDS 28, with the ToFS value included in the descriptor written into queues 43 by DMD 29. In the instance of a mismatch, the frame may be discarded. Additional checks may be performed to verify that the descriptor used to read a frame out of CDS 28 is not reading a location overwritten by another frame. For example, by including additional frame header bits in the descriptor written into queues 43 and stored with the data frame in CDS 28, for example, the destination MAC address may be checked.

A bit out of the DLT 26 indicates whether the parsed data from the data frame is being written into a static CVT 56 memory location, which is reserved for sampling-type data, or a circular buffer 60, 62, 64. When the CVT 56 location bit is set to, for example, one, the CDS 28 base address indicates a CVT 56 location, and the Smax/FrameSize value is interpreted as the preconfigured frame size that is to be stored starting at that Base Address. In this example, the frame length is fixed and the policing functions of the ingress port scheduler 24 will not allow the parsed data to be written unless the frame length indicated by the ingress interface function exactly matches the frame length indicated by the ILUT. This may prevent potential inter-frame aliasing of data within the CVT 56 in case of a received frame size error. The Base address is loaded as a preset into an address counter and the CDS 28 is written until the frame size indicated by the Smax/FrameSize value read out of the DLT 26 is reached.

To protect against stale values stored in CVT 56, parametric Ethernet frames stored in CVT 56 are appended with a 64-bit time value, which is stored following the last word of the parsed data frame in CVT 56. These parametric data frames, in addition to being stored in the CVT 56, are mirrored to other ADSs 18. Consequently, it may be required that physical ingress ports 42 that are connected to other ADSs 18 be preemptively identified so that if the parametric data frame did not arrive from another ADS 18, a copy of the descriptor may be multicast to the highest priority per-egress-port descriptor queue 43 of a physical egress ports 66 connected to other ADSs 18. Stated another way, if more up-to-date data frame arrives at an ADS 18 from a non-ADS source (such as an RIU 20), a copy of that descriptor may be multicast to the highest priority queue of each physical egress port 66 such that the data frame is likely to be mirrored by additional ADSs 18 as quickly as possible. Conversely, if the data frame arrived from another ADS 18, the Port Mask bits in the Descriptor Multicast may be cleared to ensure that the descriptor is not re-distributed to any physical egress port 66 bound for an ADS 18 to prevent an endless replication of the same data in an infinite loop.

ARINC 429 data frames not belonging to a multiword message may be written in CVT 56 for packing into parametric messages by the PMC 31. ARINC 429 specifies a 32-bit data word, yet each CVT 56 location in the CDS 28 is a 64-bit word plus 8 bits of ECC. In order to protect against stale values of A429 words in the CVT 56, each A429 word is time-tagged with the 32 MSBs of time (the LSB being 216 microseconds). Thus, each A429 word stored in CVT 56 has 32 bits of time as the MSBs and the 32-bit A429 word as the LSBs.

Central Data Sever Memory

CDS 28 may, for example, use quad data rate (QDR) memories which are shallow compared to double data rate memory (DDR). Like DDR, they are synchronous and can be ECC protected, but most provide concurrent read and write access, having an independent DDR read/write data port and a DDR read address port. These memories were specifically designed for data switching applications. In the ADS 18, to meet throughput targets, the CDS 28 memories may be clocked at, for example, 250 MHz. For example, a QDR having dual 38-bit wide DDR data ports has enough bandwidth to support 16 Gbps of full duplex data. Alternative memory speeds are envisioned based on data requirement or throughput needs.

Although the CDS 28 may be organized with up to 256 circular buffers 54, the illustrated CDS 28 is organized as three circular buffers 60, 62, 64 plus a CVT 56. Each circular buffer 60, 62, 64 is reserved for data storage, while the CVT 56 holds parsed parametric data, headers, and address lists that will be used to construct custom messages by the ADS 18 as described below.

In case there are 3 circular buffers, for 1 Gbps, 100 Mbps, and 10 Mbps data storage per our example, which circular buffer a frame is placed into depends on the slowest port to which a frame is multicast. For any set of ports grouped by the same egress rate, the CDS 28 must have enough storage at the aggregate data rate of the ports (i.e. 10 Mbps, 100 Mbps, 1 Gbps) to accommodate the time it takes to drain 512 frames at that rate. For example, the CDS 28 may provide 2 Mbytes of storage for the CVT 56 while allowing for a flexible allocation for the size of the circular buffer 60, 62, 64 dedicated to each of the egress data rates, which may be further adjusted according to the number of circular buffers 54, how many ingress or egress ports 42, 46, 66, 72 are configured at that rate, the desired parsed data frame retention time, and the requisite time to live of the frames contained within that buffer.

By way of example, the default allocation may be 24 Mbytes per circular buffer 60, 62, 64. For each circular buffer 60, 62, 64 the storage time may be 8*24M/(PortSpeed*number of ports). For example, a 24 Mbyte circular buffer provides a storage time of more than 20 seconds divided by the number of 10 Mbps ingress ports 42, 46 feeding the buffer, 2 seconds divided by the number of 100 Mbps ports 42, 46, or 0.2 seconds divided by the number of 1 Gbps ports 42, 46. The size of each circular buffer may be configurable, as appropriate. Any unused line rate at any ingress or egress port 42, 46, 66, 72 provides residual storage time for all ports sharing that buffer.

For frame switching, a circular buffer 60, 62, 64 may obviate having to establish fixed block sizes for parsed data frames and having to keep track of the unoccupied buffer allocations, which would otherwise expose the entire ADS 18 to memory leakage due to single event upsets (SEUs). SEUs are thought to be caused by subatomic particles, such as neutrons, whose frequency of occurrence increases with altitude, and which can corrupt values stored in memory and even logic. In case of circular buffer overflow, the newest data overwrites the old. All FIFO queues 40 in the ADS 18 may also use the circular buffer 54 paradigm. In this way, any SEU that corrupts the read and write pointers of the circular buffers 60, 62, 64 are guaranteed to be corrected within the amount of time that it takes to completely overwrite the buffer 60, 62, 64.

Egress Scheduling

The Egress Scheduling function of the PMS 30 determines which data is read out of the CDS 28 and which egress port 66, 72 receives it. The egress scheduling functionality is determined by four major functional components: the per-egress-port descriptor queues 43, the PMS 30, the parametric message constructor 31, and an egress arbiter, such as the rules-based scheduler 76. The rules-based scheduler 76 maintains and operates according to the four prioritized descriptor queues 43 for each egress port 66, 72. Each queue 43 may have enough capacity to hold 512 descriptors. The descriptors in the per-egress-port descriptor queues 43 were written using a broadcast bus by the descriptor multicast distributor 29. Alternatively, the PMS 30 may maintain a schedule which indicates which egress port 66, 72 the rules-based scheduler 76 should service next or which message descriptor the PMC 31 should use to access the parametric message table 58 to originate a constructed message using data read from the CVT 56 and/or from the A429 output queues.

Rules-Based Scheduling

The rules-based scheduler 76 operates as a user-configurable component within the PMS 30. The PMS 30, allows each egress port 66, 72 access to the rules-based scheduler 76 which is used to select a descriptor from its four priority queues 43 if one is available. This descriptor may be used to provide read access to the CDS 28. The PMS 30, for example, may grant each egress port 66, 72 access to the rules-based scheduler 76 in a round robin fashion, strictly timed schedule, or a predetermined algorithm. Other servicing fashions are envisioned, for instance, a weighted schedule taking into account granting additional or prioritized access based on the criticality of the egress port 66, 72. In regards to granting access to the CDS 28, the PMC 31 may be considered as another egress port 66, 72 that is granted guaranteed bandwidth access to the CDS 28 with, for instance, a maximum guaranteed bandwidth of 1 Gbps and maximum guaranteed latency between each access of less than 66 microseconds. The rules-based scheduler 76 provides arbitration to determine which priority queue's 43 descriptor is read during each port's 66, 72 access opportunity. That descriptor is then used to read and transmit a copy of a frame obtained from CDS 28 to one egress port 66, 72.

The rules-based scheduler 76 may accept as input a set of fullness threshold bits or values from each per-egress-port descriptor queue 43, as well as a queue fullness indication from each egress physical port queue 41 via the queue fullness interface 70, wherein a threshold bit may be, for instance, set to one when the fullness of queue 43 exceeds a configured threshold and another threshold bit set to one whenever the queue 41 is too full to accept a frame. Collectively, the bits contained in the queue fullness interface 70 represent the fullness of the multiple queues 41, 43 per egress port 66, 72. If a per-egress-port descriptor queue 43 is too full, the rules-based scheduler 76 may modify the service methodology on a per-queue 43 priority basis or if queue 41 is too full, sending additional frames to queue 41 may be temporarily suspended. For instance, while servicing an egress port 66, 72, if the rules-based scheduler 76 determines one or more of that port's 66, 72 per-egress-port descriptor queues 43 are too full based on the received fullness thresholds, the scheduler 76 may decide to service the full queues 43 first. In another instance, while servicing an egress port 66, 72, if the rules-based scheduler 76 determines egress-port queue 41 is too full to accept another frame, the scheduler 76 may decide to preempt servicing that port 66, 72 until the queue 41 can accept another frame. In yet another instance, if there are no descriptors to serve in any per-egress-port descriptor queues 43 for an egress port 66, 72 being serviced, the rules-based scheduler 76 may switch control access to service the next egress port 66, 72 in round-robin-type (or alternative) fashion.

As previously described, there are four per-egress-port descriptor queues 43 for each egress port 66, 72, which are prioritized. Which queue 43 gets to have its descriptor served depends on the fullness of each of the four descriptor queues 43. The fullness of each queue 43, for instance, may be measured by seven threshold levels, plus an empty flag. In this example, the seven threshold levels may indicate a varying level of "fullness." Using priority encoder logic, the seven thresholds and the empty flag may be converted into a 3-bit value, which determines which per-egress-port descriptor queue 43 will have a descriptor serviced (i.e. read data out of the CDS 28) by the PMS 30. These 12 bits, plus the output of a 4-bit counter may be used to address, for example, a 16K×3 lookup table in which the service rules of the rules-based scheduler 76 are stored. Alternatively, the rules of the rules-based scheduler 76 may be for instance, an algorithm for determining the service rules. The purpose of having a 4-bit counter for each port as an input into this lookup table is to avoid the theoretical possibility of having a static threshold combination causing the same queue to be serviced for an indeterminate period of time. It is a way to guarantee a lower bound on the rate of service given to each priority.

After the selected descriptor is read out of the selected per-egress-port descriptor queue 43 based on the rules-based scheduler 76 priority, the complete frame is readout of CDS 28 and transmitted to port 41 before the next egress port 66, 72 is allowed to have a descriptor serviced by scheduler 76 and granted an opportunity to receive a frame from the CDS 28. For switched data frames, during the readout process, the ToFS of the descriptor may be compared with that of the stored frame. If they disagree, the frame may be discarded. Each egress Ethernet port may additionally have a programmable maximum age (MaxAge), and if the difference of the ToFS and the present value of the time counter in the input port scheduler 24 Write Control function is greater than the MaxAge parameter, the frame may be discarded. Otherwise, the frame is read out of the CDS 28 by the PMS 30, and transferred to its egress port 66, 72, and transmitted to the subscriber unit 32 or virtual link 36.

Parametric Message Scheduler

The parametric message scheduler (PMS) 30 operates to schedule which message is sent to which egress port 66, 72. The PMS 30 determines which egress port is serviced next by the rules-based scheduler 76, for example in a round-robin fashion, and using the descriptor received from the per-egress-port queue 43 selected by the rules-based-scheduler 76, a complete data frame is read from circular buffer 54 in CDS 28. This read frame is transmitted to the egress port 66, 72 being serviced using the common egress interface 34.

The PMS 30 may schedule operation of the PMC 31 as if it were an egress port and controls which messages are constructed by the PMC 31 by handing it a descriptor for the message to be constructed. The descriptor received by PMC 31 references a list of entries in the Parametric Message Table 58, which detail what data from the CVT 56 or A429 output queues are to be placed into the frame being constructed. For example, the PMS 30 may provide the PMC 31 the address to a list of addresses and the list length. The addresses in the list are locations for data contained in CVT 56 or A429 output queues that is to be placed into the data frame to be constructed.

The construction of parametric data frames may be strictly scheduled. By way of example, the scheduling of up to 4096 frame constructions may be supported with a scheduled data frame departure resolution of 500 microseconds. There may be a table of counter values representing time increments of 500 microseconds, a table of counter thresholds and a table of message descriptors, all of which are referenced by the entries of a descriptor table address counter (DTAC). The descriptor format for a data frame to be constructed is further described below. Each entry of the counter value table, counter threshold table and descriptor table is associated with an instance of a data frame to be constructed.

The scheduling of message construction proceeds as follows: The DTAC scans the complete table of 4096 count values. Each count value is incremented and compared to its maximum count threshold, obtained from a table of maximum count thresholds. If the count is less than its threshold, the incremented value is simply written back into the table of count values and message construction may not be triggered. However, if the count is greater or equal to the maximum value preset for the message, the count value written back is zero and the value of the contents of the descriptor table entry referenced by DTAC, which may be the descriptor for the custom message to be transmitted, is passed to the PMC 31 to initiate the message construction function.

In this example, if there are fewer than 4096 messages to be constructed, there will be unused descriptor entries in the descriptor table which may never cause message construction to occur. In the instance where it is desirable to disable a particular descriptor location entry, the corresponding maximum count table entry may be set to a value that cannot be reached, i.e., 4096, because of an insufficient number of bits (i.e., 11) for the count value. In this example, since the PMS 30 is capable of scheduling of up to 4096 messages every 500 microseconds, the PMS 30 will not likely be a limiting factor in developing custom messages for the ADS 18. Alternatively, the schedule resolution for the construction of any message may be in increments of 500 microseconds.

Parametric Message Construction Function

When the PMS 30 determines that message construction is scheduled, it passes the descriptor together with a descriptor available indication to the PMC 31 function. The descriptor contains identifying information such that the PMC 31 may determine whether the data source for the Ethernet/A664p7 frame is from one of the A429 queues 40 and/or whether it is data which is to be scatter-gathered from CVT 56 using a list of CVT 56 addresses. For instance, if the most significant bit (MSB) of the descriptor indicates that the message is to be constructed from data in the A429 queues 40, the descriptor may contain the base address (HOLpointer) and length of a UDP/IP/MAC header that is to be directly read from the parametric message table 58 and placed into a message construction queue 40 followed by data from the A429 queue or queues.

Conversely, if the MSB of the parametric message descriptor indicates that a frame is to be constructed from data in CVT 56, then the HOLpointer is the base address in CVT 56 of an ordered and contiguous list of parametric message table 58 and CVT 56 address descriptors that are to be used in the construction of a message. In this example, the length field indicates the length of that list of address descriptors. The PMC 31 uses these address descriptors to gather selected CVT 56 data values. During construction, the list of address descriptors is first read from the parametric message table 58. The address descriptors are then used to construct the header of a message by reading from the parametric message table 58 and the payload of the message by reading from selected locations of the CVT 56 and/or the A429 output queues.

A complete data frame or "message" consists of a header, a list of parameter values and a trailer. Each data frame header field and each parameter value are stored in fixed, but non-contiguous locations of the CDS 28, as described above. Therefore, each data frame to be constructed must include an ordered list of addresses that will be used to read these scattered values out of CVT 56. To keep the PMS 30 memory small, the lists of address descriptors may themselves be maintained in a static area of memory within the CDS 28, for example, the parametric message table 58 of the CVT 56.

The parametric message descriptor supplied by the PMS 30 to PMC 31 may include, for example, an 18-bit Head of List Pointer (HOLpointer), Length of the List of addresses in 32-bit words, and a field reserved for control bits. In this example, the HOLpointer may be left-shifted and appended with zeros so that each address list starts only on a 64-byte boundary. The 'S' control bit may also indicate whether or not the descriptor is for an A664p7 message. If the descriptor is for an A664p7 message, an EflowID field in the descriptor may be used to track A664p7 sequence numbers. It is additionally envisioned that a parametric message descriptor MSB value of zero may reference a list of addresses which indirectly reference data locations that are to be written into a message. These addresses may, for instance, be contained within 64-bit locations within CVT 56, along with byte select and control information which indicates how the referenced data location is to be packed into the message. If present, the control field may contain codes to indicate LSB or MSB alignment, big endian, little endian, or munged big endian format, etc. Additional control field contents and effects are envisioned.

If the message being constructed is an A664p7 message, the PMC 31 may use a field (EflowID) in the message descriptor received from PMS 30 to access that VL's Sequence Number (SN). The SN byte may be incremented according to the rules described in A664p7 and placed as the last byte of the message payload constructed by PMC 31. Once the message frame is complete, it is transferred into a dedicated loop-back port 86, which computes a CRC, such as a CRC-32, and transfers the frame back into the common ingress interface 22 of the ADS 18 in a loop-back fashion.

There may be multiple reasons for sending the constructed message back to the common ingress interface 22 of the ADS 18 prior to transfer to a subscriber unit 32. The principal reason is safety. Even though construction of each parametric message frame is strictly scheduled, it is envisioned an A664p7 frame must be policed by separate policer 27 logic to circumvent vulnerability to a single failure. This is the reason for requiring the policing function of the ingress port scheduler 24 in an A664p7 switch, even though the subscriber units 32 may already perform traffic shaping. Within the ADS 18, the policer 27 is segregated from the PMS 30 (and hence the PMC 31) to satisfy this requirement.

A second reason for looping back constructed message may be that it avoids duplication of the DMD function. The loop-back port 86 is not performing significant operations on the message, and thus, may not be limited by operational delays. Consequently, the operational data rate of the loopback port 86 may be at, for instance, gigabit rates. The resulting impact on loop-back latency can be made negligible by, for example, distributing the frame's descriptor to a high priority per-egress-port descriptor queue 43 and programming the rules-based scheduler 76 appropriately. It is envisioned a single loop-back port 86 to loopback PMC 31 data may be sufficient to support transmission of, for example, more than 100 messages, each with an average length of 512 bytes, within less than 500 microseconds. However, additional loop-back ports 86 can be configured in the ADS 18 and dedicated to the PMC 31 generated messages.

ARINC 429 Data Path

ARINC 429 data words arrive on physical ingress ports 42 numbered sixteen to forty-eight. The Time of Arrival Recorder 50 indicates which ingress port's 42 word should be serviced next. Next, the ingress port scheduler 24 parses the data frame to identify the port of arrival (PoA) and the A429 8-bit tag, and supply each to the DLT 26, which determines whether the word is to be stored in CVT 56 (and/or any circular buffers 54) and which of the A429 egress ports 66 are to receive a copy of the word. The PMS 30 supplies a parametric message descriptor to the PMC 31 function to construct an Ethernet or A664p7 message.

The A429 words that are not part of a multiword message can also be stored in the CVT 56. In this case, each word is stored with a 32-bit time tag whose LSB is 216 microseconds. In this example, the PMC 31 function may take the A429 words together with other parameters in CVT 56 to construct an Ethernet or A664p7 frame.

ARINC 664 part 7 Sequence Number Synchronization

It is additionally envisioned that the data communications network 16 described herein may provide for A664p7 sequence number synchronization across multiple ADSs 18. In many avionics platforms, it may be advantageous for the PMC 31 functions residing on different ADS 18 instances to synchronously distribute A664p7 data frames with identical content. This is tantamount to a virtualization of a dual end system LRU but with the two virtual end systems residing on different servers and circuit boards. This A664p7 sequence number synchronization may be accomplished using a message exchange protocol that verifies that time synchronization has been achieved, provides for a message between ADSs 18 which contains the value of sequence numbers for all EflowIDs, and provides for a message which indicates a reset of the sequence numbers to zero upon a designated future time threshold, for instance, when a discrepancy in sequence numbers becomes too great.

Processor Array

The ADS 18 may also provide one or more processors 78, or a distributed processor array 78. As shown, each processor 78 includes its own virtual ingress and virtual egress port 72 connected to the switching function, and appearing as, for example, an Ethernet port. The processors 78 may operate using a single execution thread or multiple execution threads for performing calculations of messages supplied that processor 78. The function that is performed on a supplied message is driven by the information in the header of the message. The processor array is configured to serve the ADS 18 as a centralized virtual RIU (VRIU). For example, the VRIU can perform engineering units conversion from raw sensor data, compute derived parameters, and/or construct a custom message for a remote application by processing the raw data. The scheduling of custom messages minimizes system latencies and enables synchronization of distributed processing.

One example of applicable processor 78 may include a single chip microprocessor with 10/100 Ethernet interfaces specifically designed for critical mission applications for avionics systems. Another example of an applicable processor 78 may be a general purpose microprocessor. Additionally, the microprocessors may support dual-lockstep CPUs with ECC in both their cache and internal memories, which include an internal FLASH memory for non-volatile storage. The aforementioned processors 78 may be used to enable a scalable processing architecture for the ADS 18. It is additionally envisioned that such processors 78 may be used in combination with the aforementioned PMS 30 and PMC 31 functions to provide optimized parallel processing for virtually any application that can be decomposed into a collection of serial or parallel processing threads.

As described herein, the PMS 30 may harvest, format and distribute a message when a descriptor is sent to the PMC 31 to construct a message. An example of how the PMS 30 scheduling of messages can be used to synchronize operation of distributed processors is as follows: A thread running on a processor 78 will activate only upon receiving a custom message which invokes it. The output of a thread running on a processor 78 may be a parametric message that may be received by a virtual ingress port 46 at the common ingress interface 22, scheduled by the ingress port scheduler 24, and stored in the CVT 56. Moreover, the PMS 30 may iterate through the processors 78 a second time by harvesting, formatting and distributing a message based on the processed parametric message (as described above) to another processor 78 for processing. This process may repeat until a desired final result is achieved. Thus, the processing capabilities of general purpose processors may be cooperatively pipelined to form an optimized, distributed multiprocessing system. If each thread has a known maximum execution or processing time, the PMS 30 and PMC 31 functions may further optimize the utilization of the processors 78 when available or necessary.

Another detailed example may further illustrate the data flow for three parametric messages. The PMS 30, for instance, harvests a first set of parameters from the CVT 56 and constructs a first message for a first processor. The PMS 30 may also harvest a second set of parameters and construct a second message for a second processor. The first and second processors execute their different message-triggered programs in parallel and, through the ingress data path, the processed results are written into the CVT 56. The PMS 30 may subsequently construct a third message from the first and second processed results, and provide the third message for additional processing to either the first, second, or a third processor, and so on. Additionally, in this example, while the first and second processors are concurrently processing the first and second messages, the PMS 30 may construct two additional parametric messages, for example, a fourth and a fifth message for processing in the first and second processors. This processing can be strictly pipelined so that the processors 78 are capable of parallel execution with very little idle time.

The selection of which task (or thread) a given processor 78 runs is determined by the header of the message it receives from the PMS 30 and the data processed by that task is contained in the body of the message. There is no need for task switching based on an interrupt from a timer tick because, a timer tick based interrupt mechanism can effectively be achieved since the generation of PMS 30 messages adhere to a strict time schedule, as described above. Thus, a timer tick may be mimicked by enabling messages from the PMS 30 to interrupt the processor.

Mapping this PMS-message-interrupt-driven processing onto processors 78 may be further facilitated by the availability of private RAM for each processor 78 to retain state and resume its operation following the message-driven interrupt. This interrupt-driven processing capability may be useful for interrupt driven processing where a given processing thread cannot run to completion before a task switch or event-driven interrupt must occur. If message driven interrupts are enabled, it may also be possible for a message arriving from an external source due to some asynchronous event, such as an RIU 20, to bypass the CVT 56 altogether and be sent through the switching function of the ADS 18 (via, for example, one of the circular buffers 54) directly to a selected processor 78.

Interworking

Interworking may be designed to perform conversion from one protocol to another, for example, as determined by different ingress or egress physical interfaces 44, 68. One key interworking function is a Virtual End System (VES) 82, which serves as, for example, an A664p7 interface for any LRUs connected to the ADS 18, enabling them to support a simple Ethernet interface to the ADS 18 and use, for example, jumbo Ethernet frames to transport COM port data to the VES 82. The VES 82 may support a number of legacy, current, and/or future logical formats and protocols.

The embodiments disclosed herein provide an avionics data server for an avionics data communications network with coordinated operation. One advantage that may be realized in the above embodiments is that the above described embodiments operate with an efficient collection of aircraft data, just-in-time processing, precise scheduling, and distribution of that data to coordinated servers, systems, subscriber units, and displays. Additionally, the above described embodiments provide synchronized processing among distributed processors while only requiring the data servers be time synchronized. Due to the efficient operations of the avionics data servers described above, inefficiencies of excessive network and computational bandwidth due to uncoordinated network utilization may be minimized, resulting in increased bandwidth efficiency and lower power requirements. Furthermore, due to the increased efficiency and lower power requirements, a smaller circuit package may be designed due to a lower thermal profile, resulting in superior space and size advantages. When designing aircraft components, important factors to address are size, power requirements, and reliability. Reduced size, power requirements, and reliability correlate to competitive advantages during flight.

Another advantage of the above described embodiments is that the utilization of multiple circular buffers in the CDS, segregated by egress port speed, allows for increased data efficiency by overwriting data at an appropriate rate such that, for example, frames destined for a slow egress port are not overwritten by fast-arriving frames for a fast egress port. This utilization allows for the highest probability that the data frames will be consumed prior to being overwritten. Additionally, the utilization of the circular buffers eliminates the need for determining a method of keeping track of free or unused memory blocks. The oldest data is always overwritten using the circular buffer, providing fast and uncomplicated operation.

Yet another advantage of the above embodiments is that the above described embodiments significantly limits or eliminates the need for current or legacy end systems and switches, such as the A664p7 system. Additionally, the above described embodiments provide for mirroring of data across multiple servers or storage devices, providing redundancy measures in the event of a failure. Yet another advantage of the above described embodiments is that the described network provides for redundant verification of processing tasks, by allowing multiple processors, or multiple servers to perform the same calculations, which may be compared against each other.

In yet another advantage of the above described embodiments, the rule-based scheduler provides for arbitration of servicing data and egress ports based on one or more fullness indicators, allowing servicing priorities to be established. The servicing priorities allow for adaptive, yet deterministic operation of the egress scheduling functions without wasting unutilized servicing schedules.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for servicing multiple data queues in communication with a data communications network for an aircraft having a scheduler and being serviced by a single server, the method comprising:
   determining a priority value for data queues included in the set of data queues, by the scheduler, to define a dataset of priority values;
   determining a fullness value for data queues included in the set of data queues, by the scheduler, to define a data set of fullness values;
   determining a scheduling ruleset by addressing a lookup table based on a counter output and fullness value for data queues included in the set of data queues, wherein the counter output is increased at intervals of a fixed period; and
   servicing the data queues based on the determined dataset of priority values and scheduling ruleset.

2. The method of claim 1 wherein the fullness value for the data queues comprises at least one of a per-data-queue fullness value or a collective fullness value of all data queues.

3. The method of claim 2 wherein the determining a fullness value comprises at least one of determining a fullness value for each data queue coupled with a single egress port or determining a collective priority value for each egress port having at least one data queue.

4. The method of claim 1 wherein the priority value for the data queues comprises at least one of a per-data-queue priority value or a collective priority value of all data queues.

5. The method of claim 4 wherein the determining a priority value comprises at least one of determining a priority value for each data queue coupled with a single egress port or determining a collective priority value for each egress port having at least one data queue.

6. The method of claim 1 wherein the servicing comprises receiving stored data from memory, forming a custom message derived from the stored data, and transmitting the custom message to at least one subscriber unit.

7. The method of claim 1 wherein the servicing comprises the servicing one of a plurality of egress ports, wherein each egress port comprises multiple data queues.

8. The method of claim 7 wherein the servicing each egress port occurs according to a weighted schedule.

9. The method of claim 8 wherein the servicing each egress port according to a weighted schedule is weighted by egress ports connected with flight critical systems.

10. The method of claim 7 wherein the servicing each egress port occurs according to a predetermined algorithm.

11. The method of claim 1 wherein the data queues comprise message descriptor queues.

12. A communication system having a set of data queues, comprising:
    at least one ingress port that receives data;
    at least one data queue in the set of data queues that receives data from the at least one ingress port;
    an ingress port scheduler that receives data from the at least one data queue, and sends the data to a central data server and a frame description manager, wherein the central data server is comprised of at least two circular buffers, wherein each circular buffer operates at a data rate based on egress port speed assigned to that buffer; and
    a parametric message scheduler that reads data from the central data server and the frame description manager, wherein the parametric message scheduler generates a binary counter value that increments with a fixed period, a priority value for the at least one data queue; and a fullness value for the at least one data queue, wherein a scheduling ruleset is chosen based on a look up table addressed by the binary counter value and fullness value, and sending data to at least one egress port queue by based upon the scheduling ruleset and priority value.

13. The system in claim 12 wherein the binary counter comprises a 4-bit binary counter to guarantee a lower bound on the time taken to send data to an egress port.

14. The system in claim 12 wherein the parametric message scheduler comprises a rules-based scheduler and a parametric message constructor.

15. A method for servicing multiple data queues in communication with a data communications network for an aircraft having a scheduler and being serviced by a single server, the method comprising:
    writing data from the data queues into at least one circular buffer and at least one descriptor queue, wherein each circular buffer operates at a data rate determined based on egress port speed;
    determining, by the scheduler, priority values for data included in the set of circular buffers and descriptor queues;
    determining, by the scheduler, fullness values for the descriptor queues;
    determining a scheduling ruleset by addressing a lookup table based on a binary counter output and fullness value, wherein the binary counter output is increased at intervals of a fixed period; and
    servicing the circular buffers and descriptor queues based on the determined dataset of priority values and scheduling ruleset, wherein the servicing comprises sending data to at least one egress port and each egress port is associated with a circular buffer according to its transmission speed.

16. The method of claim 15 wherein the at least one egress port is connected to flight critical systems.

17. The method of claim 15 wherein the data queues receive data from at least one ingress port and at least one ingress port receives data from a distributed processor.

18. The method of claim 15 wherein the servicing comprises receiving stored data from memory, forming a custom message derived from the stored data, and transmitting the custom message to at least one subscriber unit.

* * * * *